United States Patent
Imai et al.

(10) Patent No.: US 8,667,935 B2
(45) Date of Patent: Mar. 11, 2014

(54) INTAKE/EXHAUST VALVE CONTROL DEVICE FOR INTERNAL COMBUSTION ENGINE

(75) Inventors: Yasuhito Imai, Toyota (JP); Ryuji Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/578,506

(22) PCT Filed: Apr. 5, 2010

(86) PCT No.: PCT/JP2010/056176
§ 371 (c)(1),
(2), (4) Date: Aug. 10, 2012

(87) PCT Pub. No.: WO2011/125165
PCT Pub. Date: Oct. 13, 2011

(65) Prior Publication Data
US 2013/0014715 A1    Jan. 17, 2013

(51) Int. Cl.
*F01L 9/04* (2006.01)
(52) U.S. Cl.
USPC .............. 123/90.11; 251/129.12; 361/86; 361/187
(58) Field of Classification Search
USPC .............. 123/90.11; 251/129.12; 361/86, 187
See application file for complete search history.

(56) References Cited

U.S. PATENT DOCUMENTS

| 6,705,256 B2 | 3/2004 | Yamaki et al. |
| 7,270,094 B2 | 9/2007 | Mashiki et al. |
| 7,640,899 B2 * | 1/2010 | Lewis et al. ............... 123/90.11 |

FOREIGN PATENT DOCUMENTS

| JP | 2003293799 A | 10/2003 |
| JP | 2006183603 A | 7/2006 |
| JP | 2006257995 A | 9/2006 |

* cited by examiner

*Primary Examiner* — Ching Chang
(74) *Attorney, Agent, or Firm* — Gifford, Krass, Sprinkle, Anderson & Citkowski, P.C.

(57) ABSTRACT

An intake/exhaust valve control device for an internal combustion engine including a cylinder having an intake valve and an exhaust valve includes: solenoids for driving at least one of the intake valve and the exhaust valve; a battery for supplying an electric current to the solenoids, a battery state predicting unit for predicting the voltage state of the battery; and an energization start timing setting unit for setting the current carrying start timing of the battery with respect to the solenoids based on the result of the prediction by the battery state predicting unit. According to the intake/exhaust valve control device, since it is possible to obtain the amount of energization necessary for driving the solenoids at an appropriate timing, it is possible to secure the responsiveness of the solenoids.

3 Claims, 7 Drawing Sheets ively ness time the elecness of the electromagnetic actuator decreases remarkably.

INTAKE/EXHAUST VALVE CONTROL DEVICE FOR INTERNAL COMBUSTION ENGINE

TECHNICAL FIELD

The present invention relates to an intake/exhaust valve control device for controlling an intake valve and an exhaust valve provided in a cylinder of an internal combustion engine.

BACKGROUND ART

Patent Literature 1 is an example of technical literature of this field. Patent Literature 1 discloses a valve timing control device that is provided in a cylinder of an internal combustion engine so as to control the driving timing of an intake/exhaust value. In the valve timing control device, the lower the voltage of a power source is, the earlier the energization of an electromagnetic actuator for holding the intake/exhaust valve starts to thereby prevent a delay of activation of the electromagnetic actuator due to a decrease in the voltage of the power source.

CITATION LIST

Patent Literature

[Patent Literature 1] Japanese Unexamined Patent Application Publication No. 2003-293799

SUMMARY OF INVENTION

Technical Problem

However, in the valve timing control device of the related art described above, when the voltage of the power source decreases greatly after the start of energization of the electromagnetic actuator, there is a problem in that it takes a longer time until the amount of energization necessary for driving the electromagnetic actuator is obtained, and the responsiveness of the electromagnetic actuator decreases remarkably.

An object of the present invention is to provide an intake/exhaust valve control device for an internal combustion engine capable of securing responsiveness of a driving unit by setting an energization condition of a power source with respect to the driving unit based on the result of the prediction of a voltage state of the power source.

Solution to Problem

In order to solve the problem, according to an aspect of the present invention, there is provided an intake/exhaust valve control device for an internal combustion engine including a cylinder having an intake valve and an exhaust valve, comprising: a driving unit that drives at least one of the intake valve and the exhaust valve; a power source that supplies an electric current to the driving unit; a voltage state predicting unit that predicts a voltage state of the power source; and an energization condition setting unit that sets an energization condition of the power source with respect to the driving unit based on the result of the prediction by the voltage state predicting unit.

According to the intake/exhaust valve control device for the internal combustion engine according to the above aspect, since the energization condition corresponding to the future voltage state of the power source can be set based on the result of the prediction of the voltage state of the power source, it is possible to secure an amount of energization necessary for driving the driving unit at an appropriate timing more reliably as compared to a case where the energization condition is set based on just the present voltage state of the power source. Thus, according to the intake/exhaust valve control device, since it is possible to obtain the amount of energization necessary for driving the driving unit at appropriate timing, it is possible to secure the responsiveness of the driving unit.

According to an embodiment of the present invention, the intake/exhaust valve control device of the above aspect may further include a power consumption predicting unit that predicts power consumption of devices other than the driving unit to which an electric current is supplied from the power source, and the voltage state predicting unit may predict the voltage state of the power source based on the result of the prediction by the power consumption predicting unit.

According to the intake/exhaust valve control device of the above embodiment, it is possible to predict the future voltage state of the power source with high accuracy based on the result of the prediction of the power consumption by predicting the power consumption of electronic devices to which an electric current is supplied from the power source. Thus, according to the intake/exhaust valve control device, it is possible to secure the amount of energization necessary for driving the driving unit at an appropriate timing more reliably by predicting the future voltage state of the power source with high accuracy.

According to another embodiment of the present invention, in the intake/exhaust valve control device of the above aspect, the energization condition setting unit may set the energization start timing with respect to the driving unit as the energization condition so that the lower the value of the result of the prediction of the voltage state of the power source by the voltage state predicting unit becomes, the earlier occurs the energization start timing.

According to the intake/exhaust valve control device of the above embodiment, since the lower the value of the result of the prediction of the future voltage state of the power source becomes, the earlier occurs the energization start timing, it is possible to obtain a necessary amount of energization at an appropriate timing even when the future voltage state of the power source is low and to secure the responsiveness of the driving unit.

According to another embodiment of the present invention, the intake/exhaust valve control device of the above aspect may further include a control unit that performs PWM control on the driving unit, and the energization condition setting unit may set a duty ratio of the PWM control by the control unit as the energization condition so that the duty ratio increases as the value of the result of the prediction of the voltage state of the power source by the voltage state predicting unit decreases.

According to the intake/exhaust valve control device of the above embodiment, since the duty ratio of the PWM control increases as the value of the result of the prediction of the voltage state of the power source by the voltage state predicting unit decreases, it is possible to obtain a necessary amount of energization within a scheduled time and to secure the responsiveness of the driving unit even when the future voltage state of the power source is low.

Advantageous Effects of Invention

According to the intake/exhaust valve control device, it is possible to secure the responsiveness of the driving unit by setting the energization condition of the power source with respect to the driving unit based on the result of the prediction of the voltage state of the power source.

DESCRIPTION OF EMBODIMENTS

Figure 1:
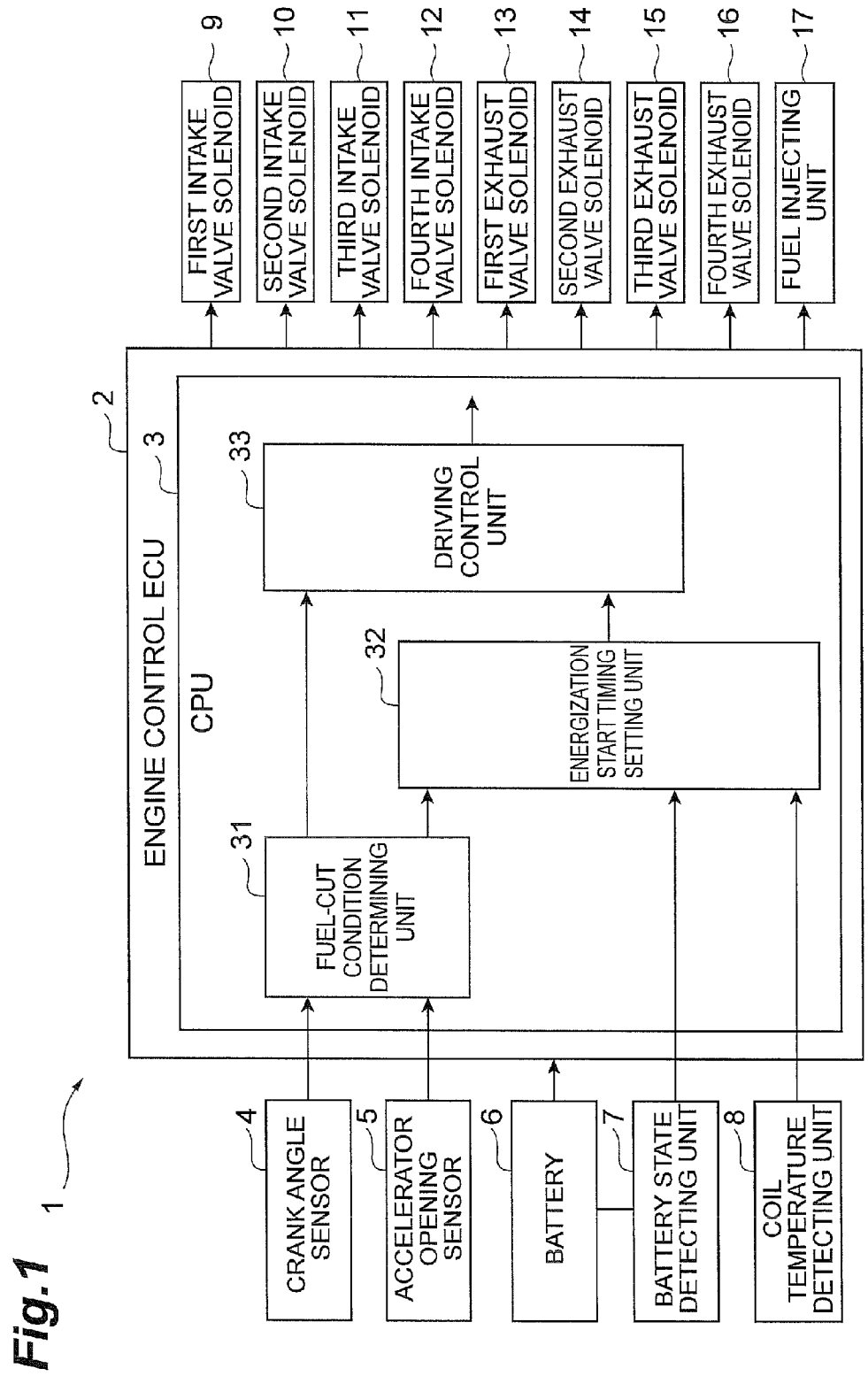
FIG. 1 is a block diagram illustrating an intake/exhaust valve control device for an internal combustion engine according to a first embodiment.

Hereinafter, preferred embodiments of the present invention will be described in detail with reference to the drawings. In the respective drawings, the same or corresponding portions will be denoted by the same reference numerals, and redundant description thereof will not be provided.

First Embodiment

As illustrated in FIG. 1, an intake/exhaust valve control device 1 for an internal combustion engine according to the first embodiment is provided in a vehicle having a 4-cylinder reciprocating engine (internal combustion engine) and controls an intake valve and an exhaust valve of each cylinder. An overall operation of the intake/exhaust valve control device 1 is controlled by an engine ECU (Electronic Control Unit) 2. The engine control ECU 2 is an electronic control unit that has a CPU (Central Processing Unit) 3 that performs a computation process.

The engine control ECU 2 controls an overall operation of the engine. The engine control ECU 2 performs fuel-cut control such that when a predetermined fuel-cut condition is established, the supply of fuel to the cylinder is stopped, and the intake valve and the exhaust valve are stopped.

The engine control ECU 2 is electrically connected to a crank angle sensor 4, an accelerator opening sensor 5, a battery 6, a battery state detecting unit 7, and a coil temperature detecting unit 8. Moreover, the engine control ECU 2 is 2 is also electrically connected to intake valve solenoids 9 to 12, exhaust valve solenoids 13 to 16, and a fuel injecting unit 17.

The crank angle sensor 4 detects a rotation angle of a crank shaft of the engine. The crank angle sensor 4 outputs a crank angle signal corresponding to the detected rotation angle of the crank shaft to the engine control ECU 2. The accelerator opening sensor 5 detects an opening (that is, a stepped-on amount) of an accelerator pedal of the vehicle, stepped on by the driver. The accelerator opening sensor 5 outputs an accelerator opening signal corresponding to the detected opening of the accelerator pedal to the engine control ECU 2.

The battery 6 stores electricity for activating in-vehicle devices. The voltage of the battery 6 is 12 V (volt) in a normal state. The battery 6 supplies electric current to the intake valve solenoids 9 to 12, the exhaust valve solenoids 13 to 16, and the fuel injecting unit 17. The supply of electric current from the battery 6 to the intake valve solenoids 9 to 12, the exhaust valve solenoids 13 to 16, and the like is controlled by the engine control ECU 2. Moreover, the battery 6 also supplies electric current to various in-vehicle devices such as a brake actuator and a steering actuator. The battery 6 functions as a power source described in claims.

The battery state detecting unit 7 detects the voltage state of the battery 6. The battery state detecting unit 7 outputs a battery state signal corresponding to the detected voltage state of the battery 6 to the engine control ECU 2. The coil temperature detecting unit 8 detects the temperature of solenoid coils that constitute the intake valve solenoids 9 to 12 and the exhaust valve solenoids 13 to 16. The coil temperature detecting unit 8 outputs a coil temperature signal corresponding to the detected temperature of the solenoid coils to the engine control ECU 2.

The intake valve solenoids 9 to 12 and the exhaust valve solenoids 13 to 16 are actuators that switch the operation state of the intake valve or the exhaust valve in accordance with a command signal from the engine control ECU 2.

The intake valve solenoids 9 to 12 include four solenoids of the first intake valve solenoid 9, the second intake valve solenoid 10, the third intake valve solenoid 11, and the fourth intake valve solenoid 12. The first, the second, the third, and the fourth intake valve solenoids 9, 10, 11, and 12 correspond to the valve bodies of the intake valves of the four cylinders, respectively.

Moreover, the exhaust valve solenoids 13 to 16 include four solenoids of the first exhaust valve solenoid 13, the second exhaust valve solenoid 14, the third exhaust valve solenoid 15, and the fourth exhaust valve solenoid 16. The first, the second, the third, and the fourth exhaust valve solenoids 13, 14, 15, and 16 correspond to the valve bodies of the exhaust valves of the four cylinders, respectively.

The intake valve solenoids 9 to 12 and the exhaust valve solenoids 13 to 16 (hereinafter referred to as solenoids 9 to 16) switch the operation state of the intake valve or the exhaust valve between a driving state and a stopped state. Here, the driving state means a state where the intake valve or the exhaust valve repeatedly opens and closes in synchronization with rotation of a cam shaft of the engine. The stopped state means a state where the intake valve or the exhaust valve is closed and stopped.

The solenoids 9 to 16 mechanically separate the intake valve or the exhaust valve which is interlocked with the cam shaft of the engine so that the operation state of the intake valve or the exhaust valve switches from the driving state to the stopped state. The solenoids 9 to 16 connect the intake valve or the exhaust valve so as to be interlocked with the cam shaft of the engine so that the operation state of the intake valve or the exhaust valve switched from the stopped state to the driving state. The solenoids 9 to 16 switch the operation state of the intake valve or the exhaust valve from the stopped state to the driving state to thereby drive the intake valve or the exhaust valve. The solenoids 9 to 16 function as a driving unit described in claims.

The fuel injecting unit 17 includes four electronically controlled injectors corresponding to the four cylinders. The fuel injecting unit 17 injects fuel from the respective injectors to thereby supply fuel into the cylinders. The fuel injecting unit 17 performs control such that injection of fuel from the respective injectors is started or stopped in accordance with a signal from the engine control ECU 2.

The CPU 3 of the engine control ECU 2 includes a fuel-cut condition determining unit 31, an energization start timing setting unit 32, and a driving control unit 33. The fuel-cut condition determining unit 31 determines whether the predetermined fuel-cut condition is established based on the crank angle signal of the crank angle sensor 4 and the accelerator opening signal of the accelerator opening sensor 5. For example, the fuel-cut condition may be established when the rotating speed of the engine is a predetermined rotating speed or higher, and a throttle valve of the engine is closed. Moreover, after the fuel-cut condition has been established, the fuel-cut condition determining unit 31 determines whether the fuel-cut condition is not established.

The energization start timing setting unit 32 performs an energization start timing setting process of setting an energization start timing when the energization of the solenoids 9 to 16 is started based on the battery state signal of the battery state detecting unit 7 and the coil temperature signal of the coil temperature detecting unit 8 when the fuel-cut condition determining unit 31 determines that the fuel-cut condition has been established.

Figure 2:
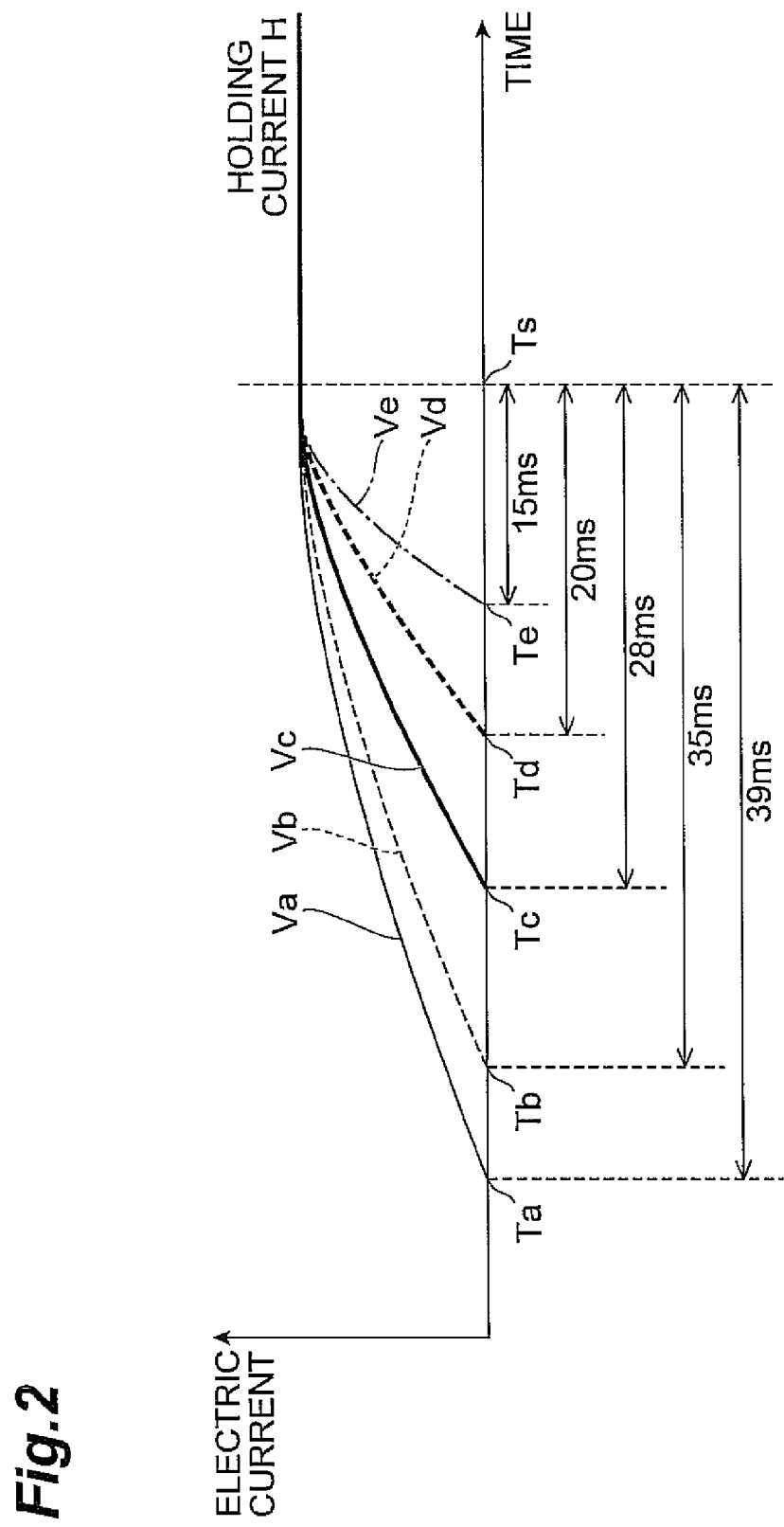
FIG. 2 is a graph illustrating a change with time of a supplied current after the start of energization of solenoids when a voltage state of a battery and the temperature of a solenoid coil change.

Here, referring to FIG. 2, a change with time of a supplied current after the start of energization of the solenoids 9 to 16 when the voltage state of the battery 6 changes will be described. FIG. 2 is a graph illustrating a change with time of a supplied current after the start of energization of the solenoids 9 to 16 when the voltage state of the battery 6 changes. When the magnitude of the current supplied to the solenoids 9 to 16 reaches a holding current H, the solenoids 9 to 16 are driven, whereby the operation state of the intake valve or the exhaust valve changes from the driving state to the stopped state. After that, the magnitude of the supplied current is maintained in the holding current H, whereby the intake valve or the exhaust valve is held in the stopped state. As the temperature of the solenoid coil, the highest temperature of the temperatures of the solenoid coils of the respective solenoids 9 to 16 is used.

In FIG. 2, a curve indicated by "Va" represents a change with time of the current supplied to the solenoids 9 to 16 when the voltage state of the battery 6 is 6 V, and the temperature of the solenoid coil is in a predetermined high-temperature region. A curve indicated by "Vb" represents a change with time of the current supplied to the solenoids 9 to 16 when the voltage state of the battery 6 is 6 V, and the temperature of the solenoid coil is in a predetermined room-temperature region lower than the high-temperature region. A curve indicated by "Vc" represents a change with time of the current supplied to the solenoids 9 to 16 when the voltage state of the battery 6 is 8 V, and the temperature of the solenoid coil is in the predetermined room-temperature region. A curve indicated by "Vd" represents a change with time of the current supplied to the solenoids 9 to 16 when the voltage state of the battery 6 is 8 V, and the temperature of the solenoid coil is in the predetermined room-temperature region. A curve indicated by "Ve" represents a change with time of the current supplied to the solenoids 9 to 16 when the voltage state of the battery 6 is 12 V (normal-state voltage), and the temperature of the solenoid coil is in the predetermined room-temperature region.

In FIG. 2, "Ts" indicates a scheduled switching time at which the operation state of the intake valve and the exhaust valve is switched by the driving of the solenoids 9 to 16. The scheduled switching time Ts is set in advance so that the fuel-cut control can be executed properly. In FIG. 2, "Ta" indicates the energization start timing corresponding to the curve "Va." Here, "Ta" is the time occurring 39 ms earlier than the scheduled switching time "Ts." Moreover, "Tb" indicates the energization start timing corresponding to the curve "Vb." Here, "Tb" is the time occurring 35 ms earlier than the scheduled switching time "Ts." Moreover, "Tc" indicates the energization start timing corresponding to the curve "Vc." Here, "Tc" is the time occurring 28 ms earlier than the scheduled switching time "Ts." Moreover, "Td" indicates the energization start timing corresponding to the curve "Vd." Here, "Ta" "Td" is the time occurring 20 ms earlier than the scheduled switching time "Ts." Moreover, "Te" indicates the energization start timing corresponding to the curve "Ve." Here, "Te" is the time occurring 15 ms earlier than the scheduled switching time "Ts."

As illustrated in FIG. 2, the rate of increase of the current supplied to the solenoids 9 to 16 decreases as the voltage state of the battery 6 decreases and the temperature of the solenoid coil increases. Thus, the energization start timing setting unit 32 sets the energization start timing so that the lower the voltage state of the battery 6 and the higher the temperature of the solenoid coil, the earlier occurs the energization start timing. That is, the energization start timing setting unit 32 performs the energization start timing setting process so that the operation state of the intake valve and the exhaust valve at the scheduled switching time "Ts" is switched. The energization start timing setting unit 32 functions as an energization condition setting unit described in the claims. Moreover, the energization start timing corresponds to an energization condition described in claims.

The driving control unit 33 controls the driving of the solenoids 9 to 16 when the energization start timing setting unit 32 sets the energization start timing. The driving control unit 33 controls the solenoids 9 to 16 using the PWM (Pulse Width Modulation) control. The PWM control is a method of controlling energization of the solenoids 9 to 16 using a pulse signal. In the PWM control, the solenoids 9 to 16 are controlled by changing the pulse width of the pulse signal. The display control unit 33 performs the PWM control by setting a duty ratio, which is the ratio of HIGH to LOW in one cycle of a pulse signal, generally to 50%.

The driving control unit 33 performs a process of switching the operation state of the intake valve and the exhaust valve at the scheduled switching time "Ts" by starting energization of the solenoids 9 to 16 at the energization start timing set by the energization start timing setting unit 32. The driving control unit 33 performs the fuel-cut control which involves controlling the fuel injecting unit 17 to stop the supply of fuel when the operation state of the intake valve and the exhaust valve is switched to the stopped state. The driving control unit 33 ends the fuel-cut control when the fuel-cut condition determining unit 31 determines that the fuel-cut condition is not established. The driving control unit 33 functions as a control unit described in the claims.

Next, the fuel-cut control of the engine control ECU 2 according to the first embodiment will be described with reference to FIG. 3.

Figure 3:
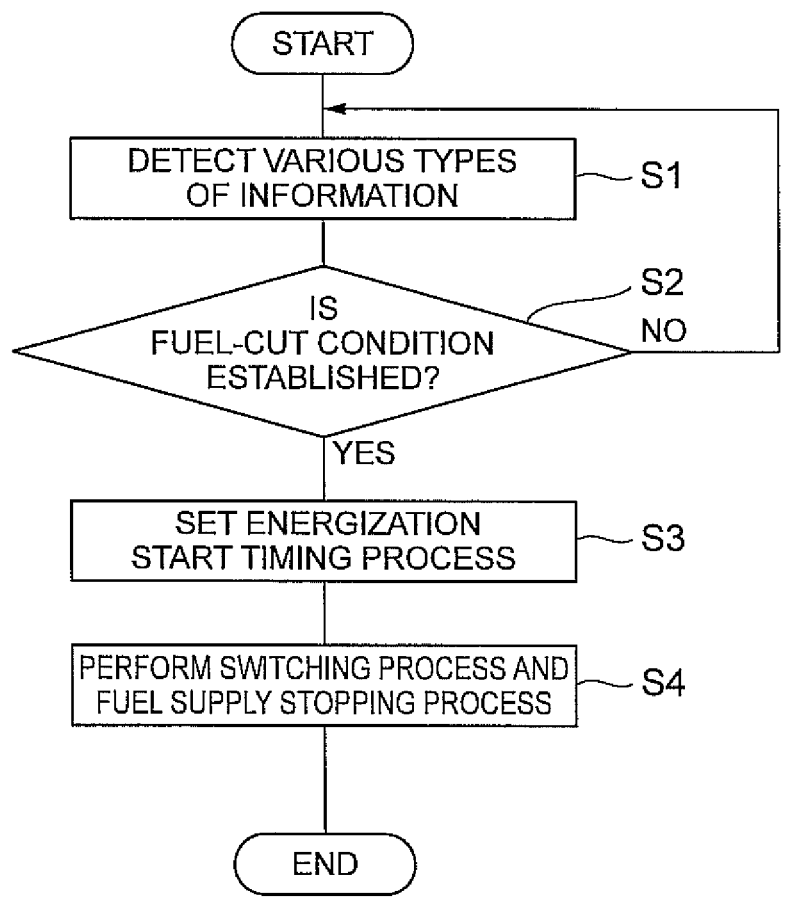
FIG. 3 is a flowchart illustrating the flow of control of an engine control ECU according to the first embodiment.

As illustrated in FIG. 3, first, the engine control ECU 2 acquires various types of information from various types of sensors 4 to 8 (S1). Subsequently, the fuel-cut condition determining unit 31 of the engine control ECU 2 determines whether the predetermined fuel-cut condition is established based on the crank angle signal of the crank angle sensor 4 and the accelerator opening signal of the accelerator opening sensor 5 (S2). The fuel-cut condition determining unit 31 acquires various types of information again by returning to step S1 when the fuel-cut condition is determined not to be established.

When the fuel-cut condition determining unit 31 determines that the fuel-cut condition is established, the energization start timing setting unit 32 performs the energization start timing setting process of setting the energization start timing at which energization of the solenoids 9 to 16 is started based on the battery state signal of the battery state detecting unit 7 and the coil temperature signal of the coil temperature detecting unit 8 (S3). The energization start timing setting unit 32 sets the energization start timing so that the lower the voltage state of the battery 6 and the higher the temperature of the solenoid coil, the earlier occurs the energization start timing.

In step S4, the driving control unit 33 performs the switching process and the fuel supply stopping process. The driving control unit 33 performs the process of starting energization of the solenoids 9 to 16 based on the energization start timing set by the energization start timing setting unit 32 so that the operation state of the intake valve and the exhaust valve is switched at the scheduled switching time "Ts." The driving control unit 33 performs the fuel-cut control by performing the process of stopping the supply of fuel after the operation state of the intake valve and the exhaust valve is switched. After that, the driving control unit 33 continues the fuel-cut control until the fuel-cut condition determining unit 31 determines that the fuel-cut condition is not established.

According to the intake/exhaust valve control device 1 for the internal combustion engine according to the first embodiment described above, by setting the energization start timing of the battery 6 with respect to the solenoids 9 to 16 so as to occur earlier based on the voltage state of the battery 6, it is possible to prevent the occurrence of a state in which the amount of energization necessary for driving the solenoids 9 to 16 is not secured quickly due to a decrease of the voltage state of the battery 6. Moreover, according to the intake/exhaust valve control device 1, since the energization start timing is set based on the temperature of the solenoid coil, it is possible to prevent the occurrence of a state in which the amount of energization necessary for driving the solenoids 9 to 16 is not secured quickly due to an increase of the temperature of the solenoid coil. Thus, according to the intake/exhaust valve control device 1, since it is possible to prevent the occurrence of a state in which the amount of energization necessary for driving the solenoids 9 to 16 is not secured quickly due to the voltage state of the battery 6 or the temperature of the solenoid coil, it is possible to secure the responsiveness of the solenoids 9 to 16.

According to the intake/exhaust valve control device 1, since it is possible to secure the responsiveness of the solenoids 9 to 16, it is possible to prevent the occurrence of a state in which, when the fuel-cut control is performed, the intake valve and the exhaust valve are not stopped quickly so that air enters into the cylinder and a catalyst deteriorates. Moreover, according to the intake/exhaust valve control device 1, since it is not necessary to prepare a large-capacity battery in order to cope with a low-voltage state of the battery 6, it is possible to decrease the cost of the battery 6.

Second Embodiment

Figure 4:
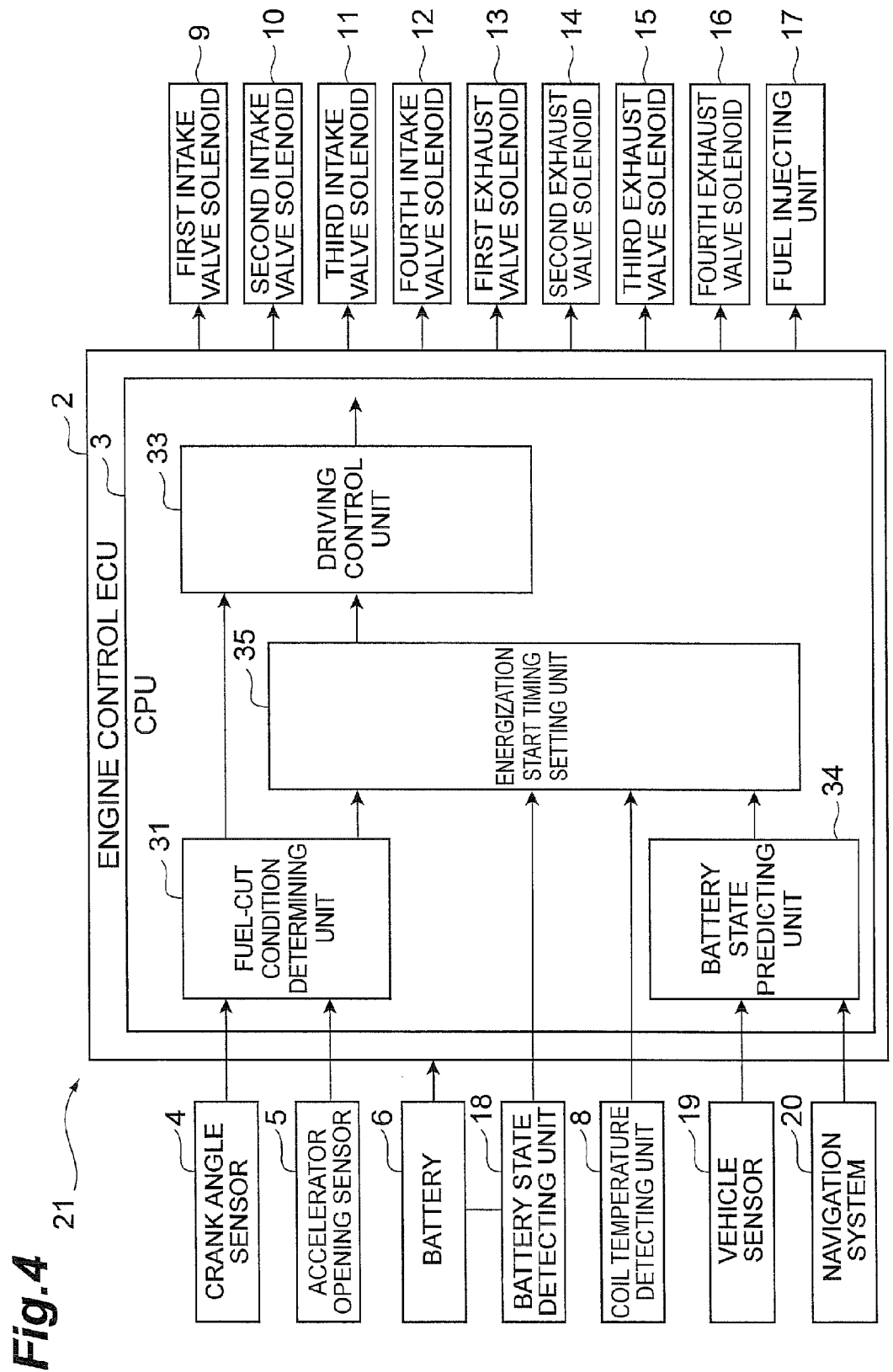
FIG. 4 is a block diagram illustrating an intake/exhaust valve control device for an internal combustion engine according to a second embodiment.

As illustrated in FIG. 4, an intake/exhaust valve control device 21 for an internal combustion engine according to the second embodiment is different from the intake/exhaust valve control device 1 according to the first embodiment in the following respects. That is, the battery state detecting unit 18 and the energization start timing setting unit 35 have functions different from those of the first embodiment. The intake/exhaust valve control device 21 includes a vehicle sensor 19 and a navigation system 20, and the CPU 3 includes a battery state predicting unit 34.

The battery state detecting unit 18 according to the second embodiment detects the voltage state of the battery 6 and records a travel distance after the battery 6 of the vehicle is replaced and the period elapsed after the replacement. The battery state detecting unit 18 outputs a battery state signal corresponding to the detected voltage state of the battery 6 and the recorded travel distance and period after replacement of battery to the engine control ECU 2.

The vehicle sensor 19 includes a vehicle speed sensor, a brake sensor, an acceleration sensor, a steering sensor, a throttle valve sensor, an inside temperature sensor, an outside temperature sensor, and the like. The vehicle sensor 19 acquires vehicle information such as travelling speed. The vehicle sensor 19 outputs the acquired vehicle information to the engine control ECU 2.

The navigation system 20 is a system that detects the current position and the travelling direction of the vehicle and provides guidance on the route to a destination. The navigation system 20 includes a road information database in which various types of road information are recorded. The navigation system 20 acquires road information of a route along which the vehicle travels from the road information database. The navigation system 20 outputs the acquired road information and route guidance information to the engine control ECU 2 as navigation information.

The battery state predicting unit 34 of the CPU 3 according to the second embodiment predicts power consumption of in-vehicle devices other than the solenoids 9 to 16, to which the battery 6 supplies electric current, based on the crank angle signal of the crank angle sensor 4, the accelerator opening signal of the accelerator opening sensor 5, the vehicle information of the vehicle sensor 19, and the navigation information of the navigation system 20.

Specifically, the battery state predicting unit 34 predicts the power consumption of an injector or an igniter of the fuel injecting unit 17 based on the crank angle signal of the crank angle sensor 4. Moreover, the battery state predicting unit 34 predicts the power consumption of a compressor of an air-conditioner based on information about inside temperature and outside temperature, included in the vehicle information of the vehicle sensor 19. Moreover, the battery state predicting unit 34 predicts the power consumption of a shift actuator based on road slope information included in the navigation information of the navigation system 20. The battery state predicting unit 34 also predicts the power consumption of the other in-vehicle devices using known methods.

After predicting the power consumption of in-vehicle devices, the battery state predicting unit 34 performs a battery voltage predicting process of predicting the voltage state of the battery 6 based on the result of the prediction of the power consumption. The battery state predicting unit 34 predicts that the voltage state of the battery 6 decreases as the value of the result of the prediction of the power consumption of the in-vehicle devices increases. The battery state predicting unit 34 functions as a voltage state predicting unit and a power consumption predicting unit described in the claims.

The energization start timing setting unit 35 performs an energization start timing setting process of setting the energization start timing of the solenoids 9 to 16 based on the result of the prediction of the voltage state of the battery 6 by the battery state predicting unit 34, the battery state signal of the battery state detecting unit 7, and the coil temperature signal of the coil temperature detecting unit 8.

Figure 5:
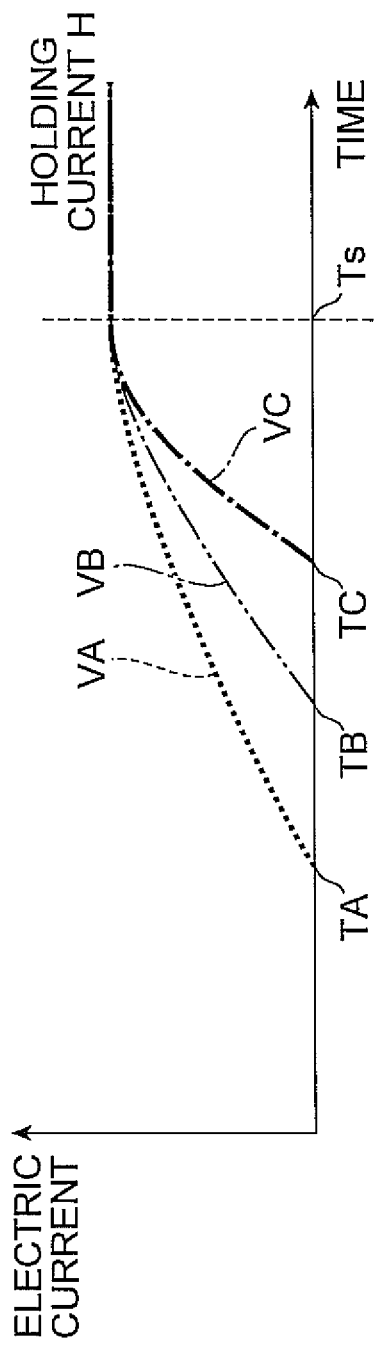
FIG. 5 is a graph illustrating a change with time of a supplied current after the start of energization of solenoids when the power consumption of in-vehicle devices other than the solenoids changes.

Here, by referring to FIG. 5, a change with time of a supplied current after the start of energization of the solenoids 9 to 16 when the power consumption of the in-vehicle devices other than the solenoids 9 to 16 changes will be described. FIG. 5 is a graph illustrating a change with time of a supplied current after the start of energization of the solenoids 9 to 16 when the power consumption of in-vehicle devices changes. In FIG. 5, the present voltage state of the battery 6 is in a normal state, and the temperature of the solenoid coil is room temperature.

In FIG. 5, a curve indicated by "VA" represents a change with time of the current supplied to the solenoids 9 to 16 when the power consumption of the in-vehicle devices is 100 W (watt), and it is predicted that the voltage state of the battery 6 will decrease to 8 V. A curve indicated by "VB" represents a change with time of the current supplied to the solenoids 9 to 16 when the power consumption of the hi-vehicle devices is 50 W, and it is predicted that the voltage state of the battery 6 will decrease to 10 V. A curve indicated by "VC" represents a change with time of the current supplied to the solenoids 9 to 16 when the power consumption of the in-vehicle devices is 0 W, and it is predicted that the voltage state of the battery 6 will not decrease but remain in 12 V.

In FIG. 5, "TA" indicates the energization start timing corresponding to the curve "VA." Moreover, "TB" indicates the energization start timing corresponding to the curve "VB." Moreover, "TC" indicates the energization start timing corresponding to the curve "VC."

As illustrated in FIG. 5, the higher the value of the result of the prediction of the power consumption of the hi-vehicle devices, the lower the value of the result of the prediction of the voltage state of the battery 6 and the lower the rate of increase of the current supplied to the solenoids 9 to 16. Thus, the energization start timing setting unit 35 sets the energization start timing so that the lower the value of the result of the prediction of the voltage state of the battery 6 is, the earlier occurs the energization start timing.

Moreover, when the aging of the battery 6 progresses, the voltage state of the battery 6 decreases greatly even if the power consumption of the in-vehicle devices is not so high. Thus, the energization start timing setting unit 35 sets the energization start timing so as to occur further earlier based on the travel distance of the vehicle after the battery 6 is replaced and the period elapsed after the replacement, included in the battery state signal, by applying a higher weight to the result of the prediction of the voltage state of the battery 6.

Next, the fuel-cut control of the engine control ECU 2 according to the second embodiment will be described with reference to FIG. 6.

Figure 6:
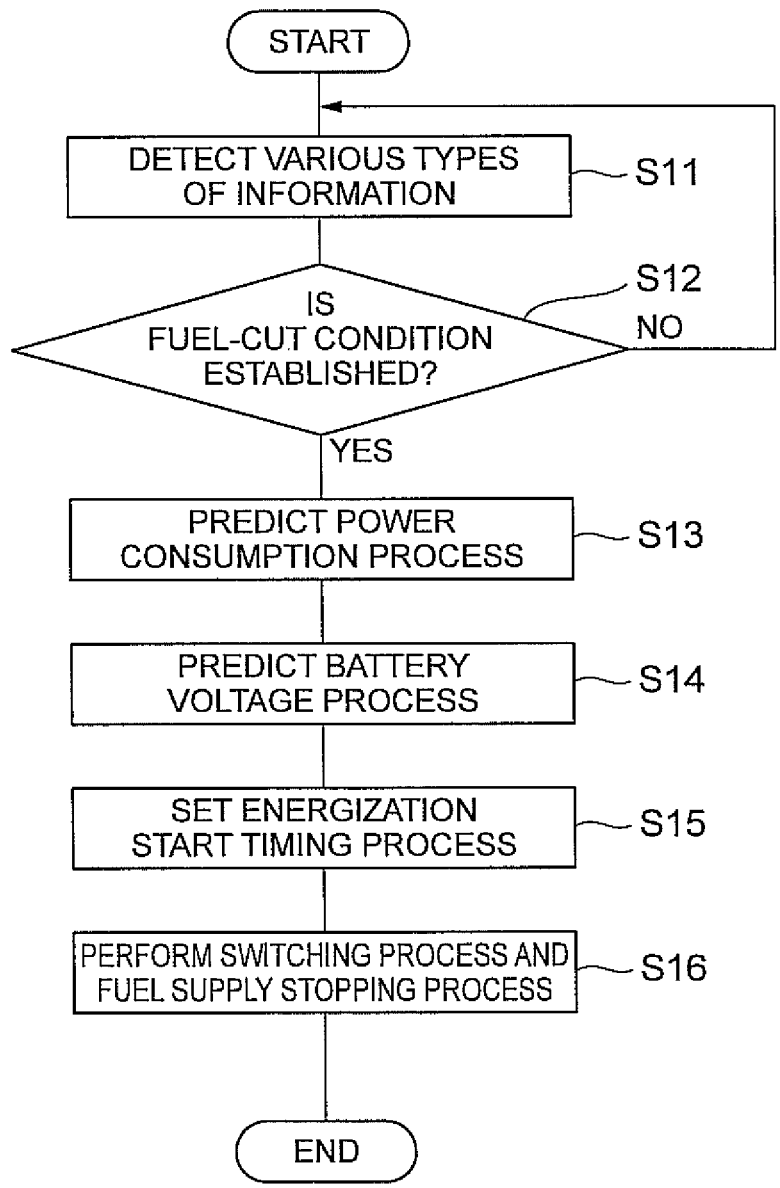
FIG. 6 is a flowchart illustrating the flow of control of an engine control ECU according to the second embodiment.

As illustrated in FIG. 6, first, the engine control ECU 2 according to the second embodiment acquires various types of information from various types of sensors 4 to 6, 8, and 18 to 20 (S11). Subsequently, the fuel-cut condition determining unit 31 of the engine control ECU 2 determines whether the predetermined fuel-cut condition is established based on the crank angle signal of the crank angle sensor 4 and the accelerator opening signal of the accelerator opening sensor 5 (S12). The fuel-cut condition determining unit 31 acquires various types of information again by returning to step S11 when the fuel-cut condition is determined not to be established.

When the fuel-cut condition determining unit 31 determines that the fuel-cut condition is established, the battery state predicting unit 34 performs the power consumption predicting process of predicting the power consumption of the in-vehicle devices other than the solenoids 9 to 16, to which the battery 6 supplies electric current, based on the crank angle signal of the crank angle sensor 4, the accelerator opening signal of the accelerator opening sensor 5, the vehicle information of the vehicle sensor 19, and the navigation information of the navigation system 20 (S13). After that, the battery state predicting unit 34 performs the battery voltage predicting process of predicting the voltage state of the battery 6 based on the result of the prediction of the power consumption of the in-vehicle devices (S14).

The energization start timing setting unit 35 performs the energization start timing setting process of setting the energization start timing of the solenoids 9 to 16 based on the result of the prediction of the voltage state of the battery 6 by the battery state predicting unit 34, the battery state signal of the battery state detecting unit 7, and the coil temperature signal of the coil temperature detecting unit 8 (S15).

In step S16, the driving control unit 33 performs the switching process and the fuel supply stopping process. The driving control unit 33 performs the process of starting energization of the solenoids 9 to 16 based on the energization start timing set by the energization start timing setting unit 35 so that the operation state of the intake valve and the exhaust valve is switched at the scheduled switching time "Ts". The driving control unit 33 performs the fuel-cut control by performing the process of stopping the supply of fuel after the operation state of the intake valve and the exhaust valve is switched. After that, the driving control unit 33 continues the fuel-cut control until the fuel-cut condition determining unit 31 determines that the fuel-cut condition is not established.

According to the intake/exhaust valve control device 21 for the internal combustion engine described above, since the energization start timing corresponding to the future voltage state of the battery 6 can be set based on the result of the prediction of the voltage state of the battery 6, it is possible to secure the amount of energization necessary for driving the solenoids 9 to 16 at the scheduled switching time "Ts" more reliably as compared to a case where the energization start timing is set based on just the present voltage state of the battery 6. Thus, according to the intake/exhaust valve control device 21, since the amount of energization necessary for driving the solenoids 9 to 16 can be obtained within the scheduled switching time "Ts", it is possible to secure the responsiveness of the solenoids 9 to 16.

Moreover, in the intake/exhaust valve control device 21, by performing the power consumption predicting process of predicting the power consumption of the in-vehicle devices other than the solenoids 9 to 16, it is possible to predict the future voltage state of the battery 6 with high accuracy from the result of the power consumption predicting process. Thus, according to the intake/exhaust valve control device 21, by predicting the future voltage state of the battery 6 with high accuracy, it is possible to secure the amount of energization necessary for driving the solenoids 9 to 16 at the scheduled switching time "Ts" more reliably.

The present invention is not limited to the above-described embodiments.

For example, the energization condition described in claims is not limited to the energization start timing. As the energization condition, the duty ratio of the PWM control of the solenoids 9 to 16 may be used.

Figure 7:
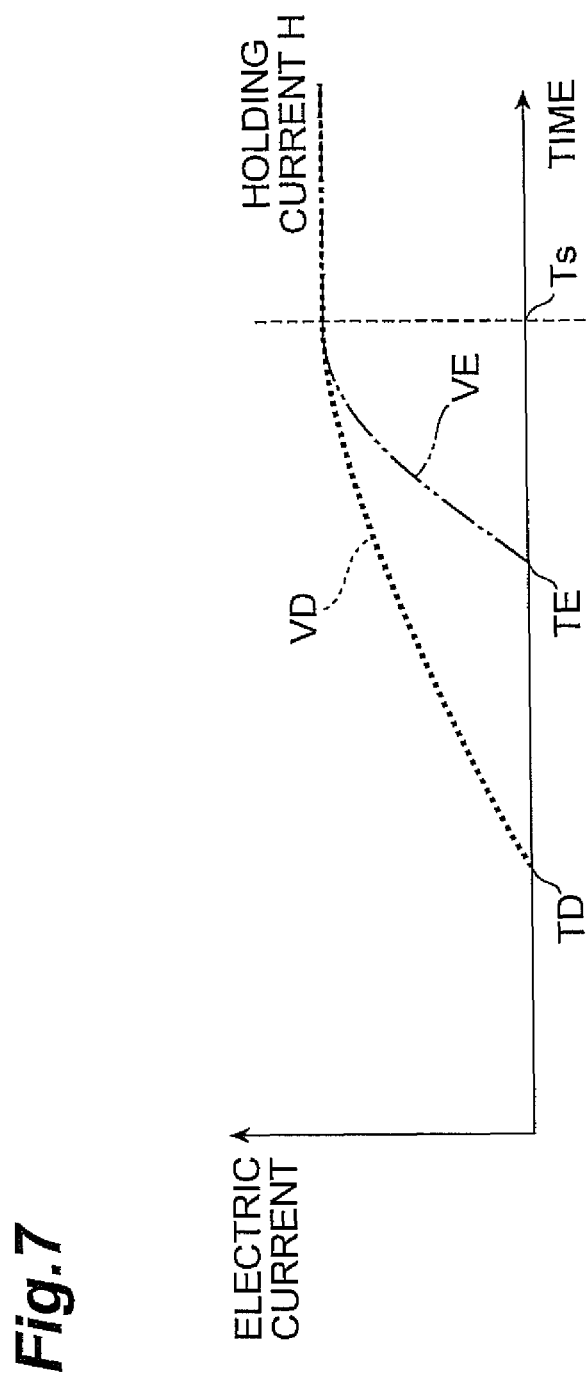
FIG. 7 is a graph illustrating a change with time of a supplied current after the start of energization of solenoids when a duty ratio is changed.

Here, by referring to FIG. 7, a change with time of the supplied current after the start of energization of the solenoids 9 to 16 when the duty ratio is changed will be described. FIG. 7 is a graph illustrating a change with time of the supplied current after the start of energization of the solenoids 9 to 16 when the duty ratio changes.

In FIG. 7, a curve indicated by "VD" represents a change with time of the current supplied to the solenoids 9 to 16 when the power consumption of the in-vehicle devices is 100 W, and it is predicted that the voltage state of the battery 6 will decrease to 8 V. The duty ratio for the curve "VD" is 50%. On the other hand, a curve indicated by "VE" represents a change with time of the current supplied to the solenoids 9 to 16 under the same condition as the curve "VD" except that the duty ratio is 100%. In FIG. 7, "TD" indicates the energization start timing corresponding to the curve "VD." Moreover, "TE" indicates the energization start timing corresponding to the curve "VE".

As illustrated in FIG. 7, the rate of increase of the current supplied to the solenoids 9 to 16 is improved remarkably when the duty ratio is changed from 50% to 100%. Thus, when the energization start timing setting unit 32 or 35 sets the energization start timing and the duty ratio appropriately, it is possible to obtain the amount of energization necessary for driving the solenoids 9 to 16 in a short period. Specifically, the energization start timing setting unit 32 or 35 sets the energization start timing and the duty ratio so that the lower the value of the present or future voltage state of the battery 6 and the higher the temperature of the solenoid coil, the earlier occurs the energization start timing and the higher the duty ratio is. In this way, the driving control unit 33 can obtain the amount of energization necessary for driving the solenoids 9 to 16 within the scheduled switching time "Ts" and to secure the responsiveness of the solenoids 9 to 16. In addition, only the duty ratio may be set without setting the energization start timing.

Moreover, when the duty ratio is set as the energization condition, the duty ratio may be set to be low if the power consumption of the in-vehicle devices other than the solenoids 9 to 16 is high, and it is predicted that the voltage state of the battery 6 will decrease greatly. In this way, it is possible to prevent the occurrence of various problems, which may occur when the voltage state of the battery 6 decreases further in order to supply electric current to the solenoids 9 to 16. In this case, it is possible to compensate for the decrease in the duty ratio by setting the energization start timing so as to occur further earlier.

Moreover, the internal combustion engine to which the intake/exhaust valve control device 1 or 21 according to the present invention can be applied is not limited to a 4-cylinder reciprocating engine but may be any engine which includes a cylinder with an intake valve and an exhaust valve. Further, the driving unit described in claims is not limited to the solenoids 9 to 16 that switch the operation state of the intake valve or the exhaust valve.

INDUSTRIAL APPLICABILITY

The present invention can be applied to an intake/exhaust valve control device for an internal combustion engine including a cylinder having an intake valve and an exhaust valve.

REFERENCE SIGNS LIST

1, 21: intake/exhaust valve control device
2: engine control ECU
3: CPU
4: crank angle sensor
5: accelerator opening sensor
6: battery (power source)
7, 18: battery state detecting unit
8: coil temperature detecting unit
9 to 16: solenoid (driving unit)
17: fuel injecting unit
19: vehicle sensor
20: navigation system
31: fuel-cut condition determining unit
32, 35: energization start timing setting unit (energization condition setting unit)
33: driving control unit (control unit)
34: battery state predicting unit (voltage state predicting unit, power consumption predicting unit)

The invention claimed is:

1. An intake/exhaust valve control device for an internal combustion engine including a cylinder having an intake valve and an exhaust valve, comprising:
   a driving unit that drives at least one of the intake valve and the exhaust valve;
   a power source that supplies an electric current to the driving unit;
   a voltage state predicting unit which is configured to predict a voltage state of the power source;
   an energization condition setting unit which is configured to set an energization condition of the power source with respect to the driving unit based on the result of the prediction by the voltage state predicting unit; and
   a power consumption predicting unit that predicts power consumption of devices other than the driving unit to which an electric current is supplied from the power source, wherein
   the voltage state predicting unit predicts the voltage state of the power source based on the result of the prediction by the power consumption predicting unit.

2. The intake/exhaust valve control device for the internal combustion engine according to claim 1, wherein
   the energization condition setting unit sets the energization start timing with respect to the driving unit as the energization condition so that the lower the value of the result of the prediction of the voltage state of the power source by the voltage state predicting unit is, the earlier occurs the energization start timing.

3. The intake/exhaust valve control device for the internal combustion engine according to claim 1, further comprising
   a control unit which is configured to perform PWM control on the driving unit, wherein
   the energization condition setting unit sets a duty ratio of the PWM control by the control unit as the energization condition so that the duty ratio increases as the value of the result of the prediction of the voltage state of the power source by the voltage state predicting unit decreases.

* * * * *